US008779677B2

(12) United States Patent
Trattler

(10) Patent No.: US 8,779,677 B2
(45) Date of Patent: Jul. 15, 2014

(54) CIRCUIT ARRANGEMENT AND METHOD FOR OPERATING A LIGHT SOURCE, IN PARTICULAR, A LIGHT-EMITTING DIODE

(75) Inventor: Peter Trattler, Graz (AT)

(73) Assignee: AMS AG, Unterpremstätten (AT)

( * ) Notice: Subject to any disclaimer, the term of this patent is extended or adjusted under 35 U.S.C. 154(b) by 184 days.

(21) Appl. No.: 13/437,749

(22) Filed: Apr. 2, 2012

(65) Prior Publication Data

US 2012/0268029 A1    Oct. 25, 2012

(30) Foreign Application Priority Data

Mar. 31, 2011    (DE) .......................... 10 2011 015 712

(51) Int. Cl.
*H05B 37/02* (2006.01)
*H05B 33/08* (2006.01)
*G03B 15/05* (2006.01)

(52) U.S. Cl.
CPC ............ *H05B 33/0815* (2013.01); *G03B 15/05* (2013.01)
USPC ...................................... 315/240; 315/227 R

(58) Field of Classification Search
None
See application file for complete search history.

(56) References Cited

U.S. PATENT DOCUMENTS

| 7,969,121 | B2* | 6/2011 | Smith et al. .................... 320/167 |
| 7,990,074 | B2* | 8/2011 | Sandner et al. ................ 315/291 |
| 8,174,209 | B2* | 5/2012 | Bayer et al. .................... 315/294 |
| 8,493,036 | B2* | 7/2013 | Ferrario ........................ 320/166 |
| 2002/0014860 | A1 | 2/2002 | Rachwal |
| 2008/0111423 | A1* | 5/2008 | Baker et al. ..................... 307/64 |
| 2008/0129219 | A1 | 6/2008 | Smith et al. |
| 2009/0108775 | A1 | 4/2009 | Sandner et al. |
| 2009/0167260 | A1 | 7/2009 | Pauritsch et al. |

FOREIGN PATENT DOCUMENTS

| DE | 10 2005 030 123 | 1/2007 |
| DE | 10 2007 051 793 | 5/2009 |
| DE | 10 2009 018 098 | 10/2010 |

OTHER PUBLICATIONS

"TPS61325-1.5A/4.1A Multiple LED Camera Flash Driver With I²CTM Compatible Interface" Texas Instruments Inc., Dallas, Texas, SLVS977—Feb. 2010, www.ti.com.

* cited by examiner

*Primary Examiner* — Alexander H Taningco
*Assistant Examiner* — Nelson Correa
(74) *Attorney, Agent, or Firm* — McDermot Will & Emery LLP

(57) ABSTRACT

A circuit arrangement for driving a light source, in particular, a light-emitting diode, comprises a first adjustable current path (1), that connects a terminal (BAT_IN) for a battery to a terminal (CAP_IN) for a capacitor, a second current path (2) that connects the terminal (CAP_IN) for a capacitor to a terminal (LED_OUT) for a light source, and a third adjustable current path (3) that connects the terminal (BAT_IN) for a battery to the terminal (LED_OUT) for a light source. A control unit (CTRL) is provided that has a control input (IN) and is set up to adjust current intensities (I_CHRG, I_CAP, I_DIRECT) on the first, second and third control paths (1, 2, 3), respectively, as a function of control signals (I_in) that can be applied to the control input (IN). A method for operating a light source, in particular, a light-emitting diode, is also proposed.

12 Claims, 6 Drawing Sheets

CIRCUIT ARRANGEMENT AND METHOD FOR OPERATING A LIGHT SOURCE, IN PARTICULAR, A LIGHT-EMITTING DIODE

RELATED APPLICATIONS

This application claims the priority of German Application No. 10 2011 015 712.3 filed Mar. 31, 2011, the entire content of which is hereby incorporated by reference.

BACKGROUND OF THE INVENTION

1. Field of the Invention

The present invention relates to a circuit arrangement and a method for operating a light source, in particular, a light-emitting diode.

2. Background of the Invention

Mobile multimedia devices such as compact cameras, mobile telephones and smartphones are combining an ever-increasing variety of functions. Because of this, these devices also require a continuously increasing power consumption, which must be covered by modern energy suppliers. Electrochemical double-layer capacitors or supercapacitors offer a high energy density and capacity, which distinguishes them for mobile usage. With increasing miniaturization of the multimedia devices, however, ways must be found to be able to use small and compact components of this type.

It is difficult to imagine modern multimedia devices without camera functions. Flash light sources such as an LED flash are also used in this regard, and because of their high power requirements, they are a major load that must be met by means of supercapacitors. Special driver circuits are capable of storing sufficient energy from a battery in a supercapacitor and providing it quickly in order to initiate the flash. However, ordinary commercial circuits include only a few measures with which an energy-efficient management of energy would be possible. The result is that the installed supercapacitors must have unnecessarily large dimensions.

SUMMARY OF THE INVENTION

One object of the present invention is to provide a circuit arrangement and a method for operating a light source that can provide a sufficient supply of power in a compact implementation.

In one embodiment, a circuit arrangement for driving a light source, in particular, a light-emitting diode, comprises a first adjustable current path, which connects a terminal for a battery to a terminal for a capacitor. A second adjustable current path, which connects the terminal for a capacitor to a terminal for a light source, is also provided. Finally, the circuit arrangement comprises a third adjustable current path, which connects the terminal for a battery to the terminal for a light source. A control unit is used to adjust current intensities on the first, second and third current paths.

In the operation of the circuit arrangement, a battery or a rechargeable battery is connected at the terminal for a battery, for example. The latter is used to provide a battery voltage and to allow the operation of connected loads with the circuit arrangement. In addition, a conventional capacitor or, preferably, a supercapacitor is connected to the terminal for a capacitor. It is charged with a charging voltage depending on the battery voltage and is available to the circuit as an energy accumulator. A light source, preferably a light-emitting diode, is connected to the terminal for a light source. This light source can be operated by means of the second and/or third adjustable current path, preferably as a flash lamp.

The control unit is furnished in order to adjust the current intensities on the first, second and third current paths depending on a control signal that can be applied at the control terminal. Thus the first adjustable current path is used, for example, to charge the capacitor. The light source can be operated with the second and third current paths by adjusting appropriate current intensities.

The proposed circuit arrangement has the advantage that, in addition to the charge voltage stored in the capacitor, the battery voltage can be used directly to operate the light source, with an appropriately adjusted current intensity. The circuit arrangement is particularly efficient due to this double power supply. This has the advantage that the capacitor used, preferably the supercapacitor, can be chosen to be smaller and more compact. In this way it is possible to enable operation of the light source, even if a compact construction is required. Cost savings also result from the smaller overall size of the capacitor.

In another embodiment, the control unit adjusts the respective current intensities in a charging mode and in a first operating mode. In the charging mode, the charging current intensity is adjusted on the first current path. In the first operating mode, a capacitor current intensity is adjusted on the second current path, and a current intensity for direct use is adjusted on the third path.

The charging current intensity determines how the capacitor is charged and thus the level of the charging voltage. This is preferably performed separately from the remaining current paths. In the first operating mode, on the other hand, both the capacitor current intensity and the intensity of the current for direct use are adjusted. During the first operating mode, the capacitor is discharged according to the adjusted capacitor current intensity, in order to use the light source as a flash, for example. The supercapacitor or the capacitor is directly discharged at the level of the adjustable capacitor current intensity. The direct-use current is fed directly to the light source and its level is defined as the direct-use current intensity by means of the control unit.

In another embodiment, the control unit is set up to switch between the charging mode and the first operating mode. This is done in such a manner that the charging current intensity is different from zero only in the charging mode. In this way the capacitor is charged only during charging mode.

In the generally temporally successive first operating mode, the capacitor current intensity and the direct-use current intensity are each different from zero. The capacitor current intensity and the direct-use current intensity are preferably adjusted simultaneously.

A charging phase and a first operating phase are thus defined by the above-presented separation between charging mode and first operating mode. These phases can be initiated by the control signal at the control unit, for example. The light source is preferably triggered in the nature of a flash in the first operating mode.

In another embodiment, the circuit arrangement has a first DC-DC converter. The latter is coupled to the terminal for a battery in such a manner that the first and third adjustable current paths comprise the first DC-DC converter. The DC-DC converter is also controllably connected to the control unit by means of a control line.

A further miniaturization of the circuit arrangement can be achieved by the shared usage of the first DC-DC converter by the first and third adjustable current paths.

In another embodiment, the first DC-DC converter comprises a load current transistor that couples the terminal for a battery with the terminals for a capacitor and for the light source by means of its load side. The load current transistor is connected to the control unit by means of its control side. The first DC-DC converter further comprises a charging current transistor, the latter being part of a series circuit of the terminal for a battery, the charging current transistor by means of its load side, a measuring unit and the control unit. The charging current transistor is additionally connected by means of a control side to the control unit.

Depending on the battery voltage, a load current is fed into the first and third adjustable current paths. The load current can be adjusted by means of the control unit via the charging current transistor. The measuring unit is set up to detect the load current for this purpose. An inductor that can be connected to the terminal for a battery serves as an energy accumulator for the first DC-DC converter.

In the proposed embodiment, the first DC-DC converter obviates the necessity for an additional power source, or alternatively, the connection of a resistor on the side of the electrical load such as the light source. In a certain sense, the DC-DC converter corresponds to a power source. The DC-DC converter can additionally be used in the manner of a step-up/step-down converter.

In another embodiment, the circuit arrangement has a fourth adjustable current path. This fourth current path comprises a second DC-DC converter, which is connected by means of a terminal for a DC-DC converter to the terminal for a capacitor. The fourth current path couples the terminal for a DC-DC converter to the terminal for a light source.

In order to be able to use the charging voltage that can be stored in the capacitor particularly efficiently, the capacitor can be discharged with the aid of a fourth adjustable current path with an additional auxiliary current intensity in accordance with the second DC-DC converter, in addition to the discharging according to the capacitor current intensity. This preferably takes place in the manner of a step-up/step-down converter. In this manner, it is possible to realize the capacitor or the supercapacitor with an even smaller overall dimension.

Alternatively or additionally, the second adjustable current path can comprise the second DC-DC converter, and the terminal for a capacitor can comprise the terminal for a rectifier.

In another embodiment, the first, second, third and fourth current paths each have controllable current sources. In this manner it is possible to adjust current intensities on the current paths, such as the charging, capacitor or direct-use current intensity, flexibly with different values.

In another embodiment, the first, second, third and fourth current paths each comprise controllable switches. In this manner it is possible to adjust the current paths between a current intensity equal to zero or, for example, a value dependent on the first DC-DC converter. The switches are inherently provided by the controllable current sources. The switches in the first, second, third and fourth current paths may be realized by the controllable current sources In an embodiment, the controllable current sources each comprise a transistor which controls the current that flow through the controllable current source. The transistor is switched into a non-conducting state to set the current intensity of the current path to zero. Thus, the transistor can be used as a switch. The control unit is connected to each of the controllable current sources and is configured to be able to switch the transistor into the non-conducting state and into adjustable conducting states.

In another embodiment, the control unit is set up to adjust the directly-used current intensity only by means of the third current path in a second operating mode.

For this purpose, the control unit adjusts the first and second current paths based on the control signal so that the charging and capacitor current intensities are equal to zero. In other words, the direct-use current intensity is taken directly from the battery in order to operate the light source.

This has the advantage that the battery voltage can be used directly to operate the light source without loading the capacitor or the supercapacitor. In a multimedia device in which the circuit arrangement is installed, it is possible in this way, for example, to implement a flashlight function that can be immediately activated. This is also known as a torch function.

In one embodiment, a method for operating a light source, in particular a light-emitting diode, comprises initially adjusting current intensities. A battery voltage is used to adjust a respective current intensity on a first, second and third adjustable current path. Subsequently a capacitor is charged in a charging mode to a charge voltage by means of the first adjustable current path. Finally the light source is operated in a first operating mode by means of the second and third adjustable current paths. During the first operating mode, the capacitor is discharged according to the adjusted capacitor current intensity, in order to use the light source as a flash lamp, for example.

The proposed method has the advantage that, in addition to the charge voltage stored in the capacitor, the battery voltage can be used directly to operate the light source, with an appropriately adjusted current intensity. The circuit arrangement is particularly efficient due to this double power supply. This has the advantage that the capacitor used, preferably a supercapacitor, can be chosen to be smaller and more compact. In this way it is possible to enable operation of the light source, even if a compact construction is required. Cost savings also result from the smaller overall size of the capacitor.

In another embodiment, a charging current intensity is adjusted based on the battery voltage in the first current path in charging mode. In the first operating mode, a capacitor current intensity is adjusted on the second current path based on the charging voltage, and a current intensity for direct use is adjusted on the third path based on the battery voltage.

The charging current intensity determines how the capacitor is charged and thus the level of the charging voltage. This is preferably performed separately from the remaining current paths. In the first operating mode, on the other hand, both the capacitor current intensity and the intensity of the direct-use current are adjusted. The supercapacitor or the capacitor is directly discharged at the level of the adjustable capacitor current intensity. The direct-use current is fed directly to the light source and defined at the level of the direct-use current intensity.

According to another embodiment, the charging current intensity is different from zero only in the charging mode. The capacitor current intensity and the direct-use current intensity are each different from zero in the first operating mode.

In this way the capacitor is charged only during charging mode. In the preferably temporally successive first operating mode, only the capacitor current intensity and the direct-use current intensity are each different from zero. The capacitor current intensity and the direct-use current intensity are preferably adjusted simultaneously.

A charging phase and a first operating phase are thus defined by the above-presented separation between charging mode and first operating mode. These phases can be initiated at the control unit by the control signal. The light source is preferably triggered in the nature of a flash lamp in the first operating mode.

In another embodiment, the control unit is set up to adjust the direct-use current intensity only by means of the third current path in a second operating mode.

In the second operating mode, the light source is directly operated in a certain sense in that it is supplied only by the battery and not additionally via the capacitor with its charge voltage. In this manner, the light source can be used as a flashlight, also known as a "torchlight."

According to another embodiment, an auxiliary current intensity is adjusted, depending on the charging voltage, in the first operating mode by means of a fourth adjustable current path. This auxiliary current intensity is superimposed both on the direct-use current intensity and the capacitor current intensity in order to operate the light source.

During the first operating mode, the capacitor is discharged according to the adjusted capacitor current intensity, in order to use the light source as a flash lamp, for example. As a rule, however, a residual charge remains in the capacitor on the second adjustable current path. By means of the fourth adjustable current path, it is possible to use even the residual charge. For this purpose, the fourth adjustable current path preferably comprises a second DC-DC converter, in the form of a step-up converter for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in detail below for several exemplary embodiments with reference to figures. Insofar as circuit parts or components correspond to one another in function, a description of them will not be repeated in each of the following figures.

DETAILED DESCRIPTION OF THE DRAWINGS

Figure 1:
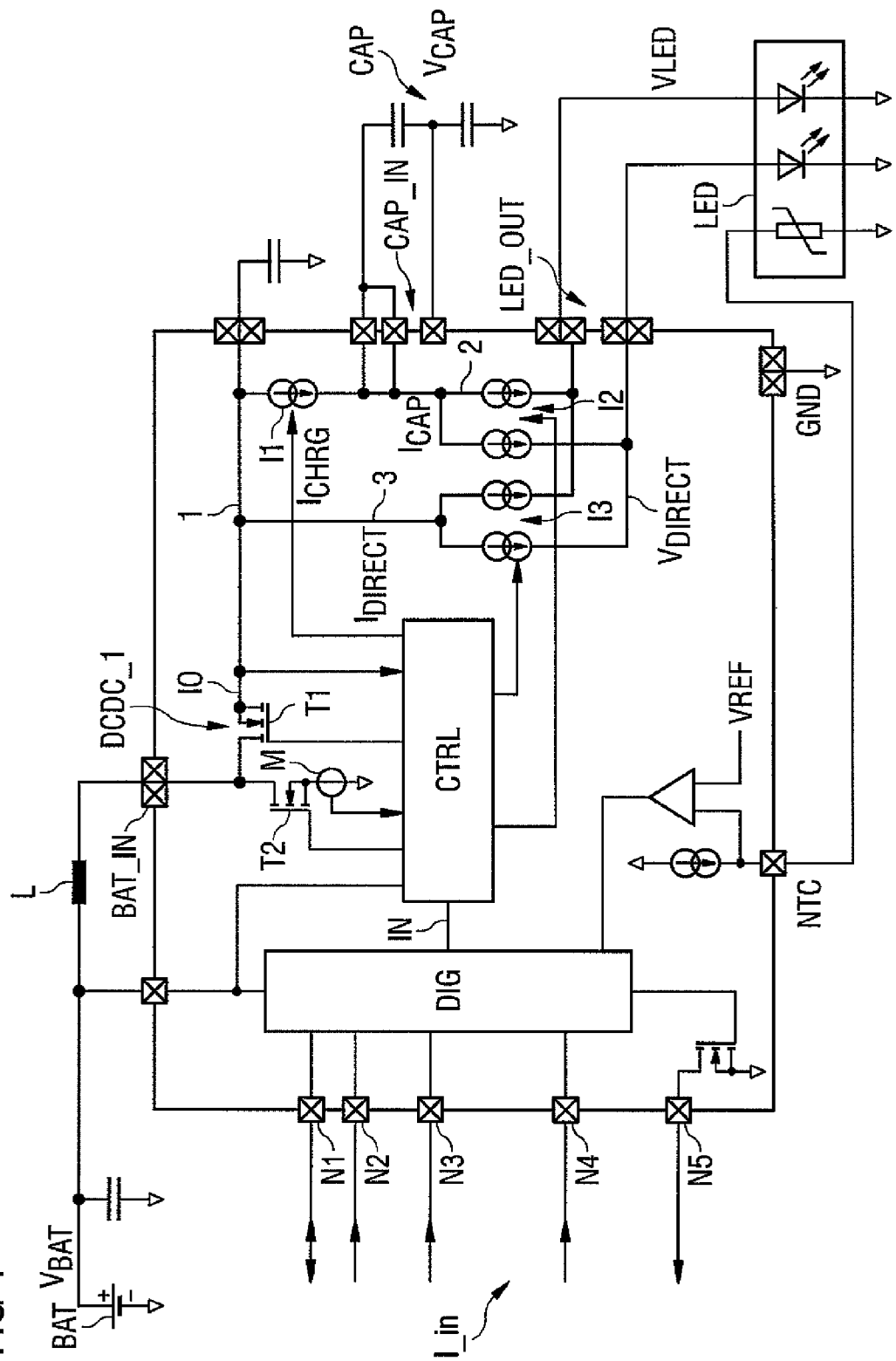
FIG. 1 shows an exemplary embodiment of a circuit arrangement for operating a light source according to the invention.

FIG. 1 shows an exemplary embodiment of a circuit arrangement for operating a light source according to the invention. The circuit arrangement comprises different terminals. A terminal BAT_IN for a battery is connected to a battery BAT and is supplied with a battery voltage VBAT via an inductor L coupled between the battery BAT and the terminal BAT_IN. A terminal CAP_IN for a capacitor is used for connecting a capacitor CAP. This capacitor CAP can be of various types, but it is preferred if capacitor CAP is a supercapacitor. A terminal LED_OUT is used for connecting a light source, in particular a light-emitting diode LED. Additional nodes N1, N2, N3, N4, N5 are used for supplying control signals I-in to a digital control unit DIG to which they are connected. The digital control unit DIG supplies the control signals I-in at an input IN of a control unit CTRL to which it is connected.

The circuit arrangement comprises several adjustable current paths. A first current path 1 connects the terminal BAT_IN for a battery to the terminal CAP_IN for a capacitor. The adjustable current path 1 has an adjustable current source I1. The second adjustable current path leads from the terminal CAP_IN for a capacitor to the terminal LED_OUT for a light source and comprises a second adjustable current source I2. The third adjustable current path connects the terminal BAT_IN for a battery to the terminal LED_OUT for a light source. The adjustable current path 3 also has an adjustable current source I3. The adjustable current sources I1, I2, I3 are each connected to the control unit DIG by control lines and are each used to adjust current intensities that flow in the corresponding current paths 1, 2, 3.

For feeding in a load current to the circuit arrangement, the first and third current paths 1, 3 comprise a first DC-DC converter DCDC_1. The latter is controllably connected to the control unit CTRL and has an external inductor L. Thereby it is possible to integrate the circuit arrangement into a chip. Alternatively, the circuit arrangement can comprise the inductor L.

The first DC-DC converter DCDC_1 comprises a load current transistor T1 that couples the terminal BAT_IN for a battery with the terminals CAP_IN for a capacitor and LED_OUT for the light source by means of its load side. The load current transistor T1 is connected to the control unit CTRL by means of its control side. The first DC-DC converter DCDC_1 further comprises a charging current transistor T2, the latter being part of a series circuit of the terminal BAT_IN for a battery, the charging current transistor T2 by means of its load side, a measuring unit M and the control unit CTRL. Measuring unit M can be a current sensor, e.g. a resistor, and "reports" its current to control unit CTRL. This way, the DC-DC convertor can be operated in current mode. The charging current transistor T2 is additionally connected by means of a control side to the control unit CTRL.

Based on the battery voltage VBAT that is present at the terminal BAT_IN for a battery, a load current I0 is fed into the first and third adjustable current paths 1, 3. The load current I0 can be adjusted by means of the control unit CTRL via the charging current transistor T2. The measuring unit M is set up to detect the load current for this purpose. An inductor L that can be connected to the terminal for a battery BAT_IN serves as an energy accumulator for the first DC-DC converter DCDC1.

In the proposed embodiment, the first DC-DC converter obviates the necessity for an additional power source, or alternatively, the connection of a resistor on the side of the electrical load such as the light source. In a certain sense, the DC-DC converter corresponds to a power source. The DC-DC converter can additionally be used in the manner of a step-up/step-down converter.

The operation of the circuit arrangement will be discussed in detail below with reference to FIGS. 2A, 2B and 3.

Figure 2A:
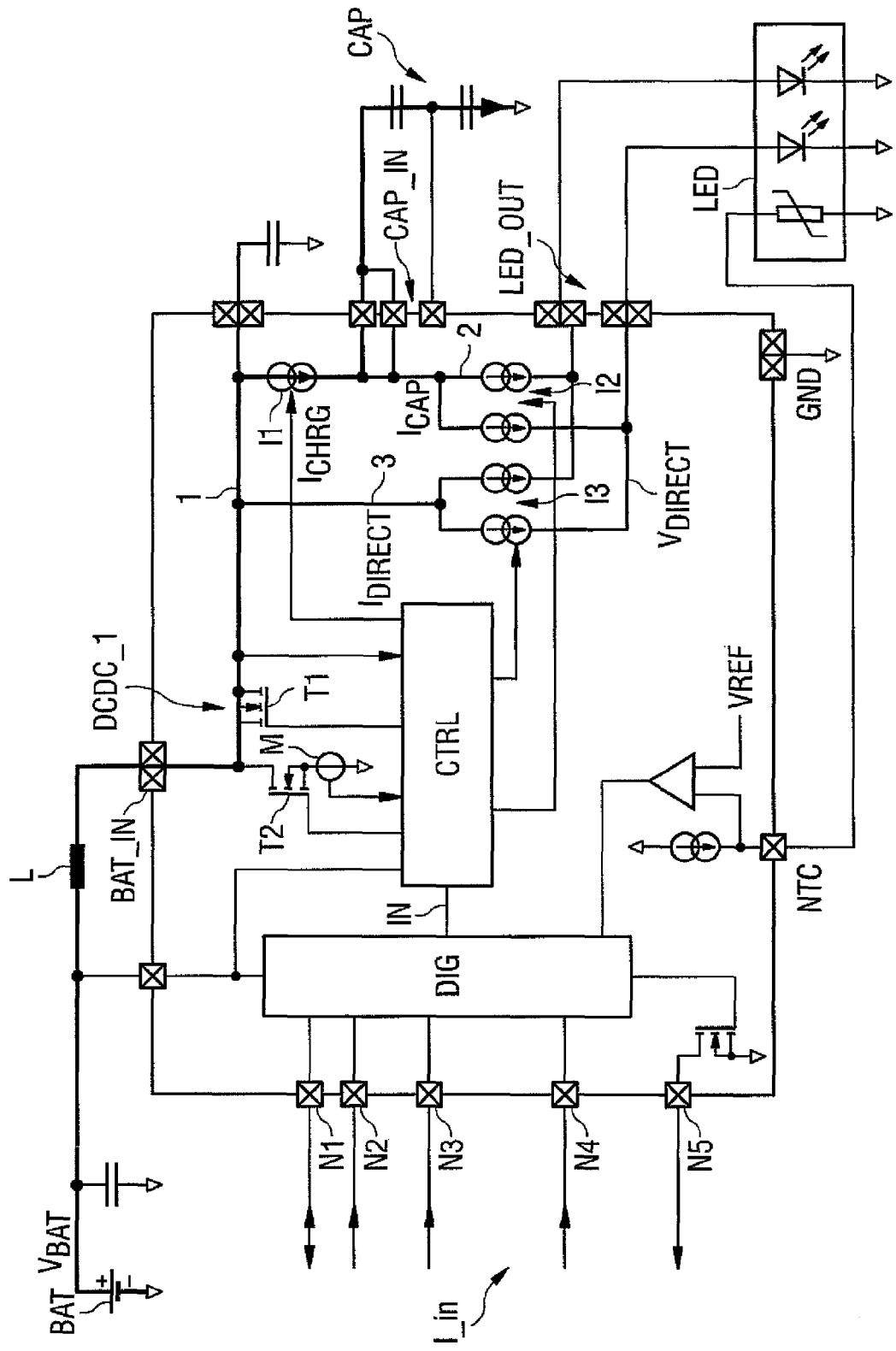
FIGS. 2A, 2B show an exemplary embodiment of the circuit arrangement in a charging mode and a first operating mode according to the invention.

FIG. 2A shows the circuit arrangement of FIG. 1 in a charging mode CHRG according to the invention. In charging mode, only the first adjustable current path 1 is activated, and a charging current intensity I_CHRG is adjusted at the first current source I1 by the control unit CTRL. A capacitor CAP is then charged at this current intensity. This charging process is marked in FIG. 2A as a bold arrow.

Figure 2B:
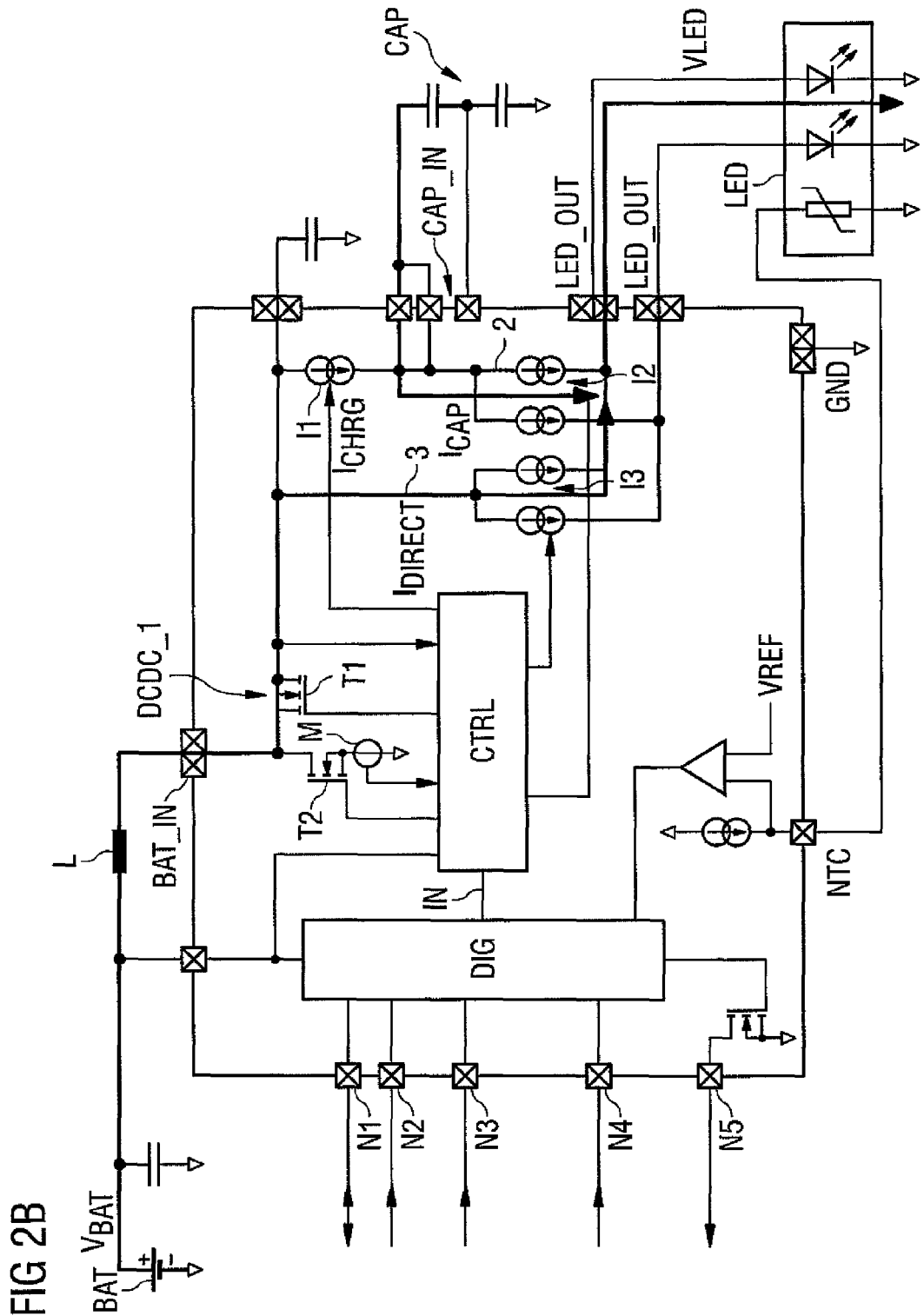

FIG. 2B shows an operation of the circuit arrangement of FIG. 1 with a first operating mode FLSH according to the invention. The first operating mode is used in this example as a flash mode for triggering the light-emitting diode as a flash lamp. For this purpose, both the second and the third current paths 2, 3 are activated. A capacitor current intensity I_CAP is set on the second adjustable current path at the second current source I2 by the control unit CTRL, whereas a direct-use current I_DIRECT is adjusted on the third adjustable current path 3. The charging current I_CHRG is selected to be zero in this case.

At the terminal LED_OUT for a light source, the direct-use current I_DIRECT and the capacitor current I_CAP are superimposed and are fed to the light-emitting diode LED. The latter is triggered for a defined time duration in the manner of a flash lamp, with the capacitor or supercapacitor being discharged according to its charge voltage VCAP.

Both the battery and the charge stored in the capacitor are effectively used for driving the light-emitting diode in this way. The battery is used by the first DC-DC converter DCDC_1 which, as a step-up converter for example, only has to convert the battery voltage VBAT to a sum of a direct voltage V_DIRECT and the light-emitting diode voltage V_LED. The capacitor CAP or the charge corresponding to the charging voltage VCAP is discharged directly via the second current source I2 of the second current path 2. The direct voltage V_DIRECT in this case falls across the third current source I3 of the third current path 3. The light-emitting voltage V_LED corresponds to the voltage present at the terminal LED_OUT for a light source.

With the aid of the double current supply for the light-emitting diode in the first operating mode, it is possible to select a smaller capacitor than would be possible for a direct operation without the third current path 3. In a typical application without a third current path, the size of the capacitor CAP is roughly $18\times20\times3$ mm$^3$ for a capacitor current intensity of 5 A. According to the invention, this size is reduced to $18\times20\times2$ mm$^3$, which corresponds to a volume reduction of 30%. The capacitor current intensity I_CAP is selected as 3 A and the direct-use current intensity as 2 A, which corresponds in sum to 5 A, as above. For an equal total current intensity, a markedly smaller capacitor can thus be used. Since supercapacitors become more expensive the larger they are, costs can also be saved in a compact implementation. If a light-emitting diode is used together with a supercapacitor as described above as a flash lamp, there is the advantage that this design can be implemented with a thinner shape as compared to a xenon flash. This advantage can be expanded even further with the aid of the proposed circuit arrangement.

Figure 3:
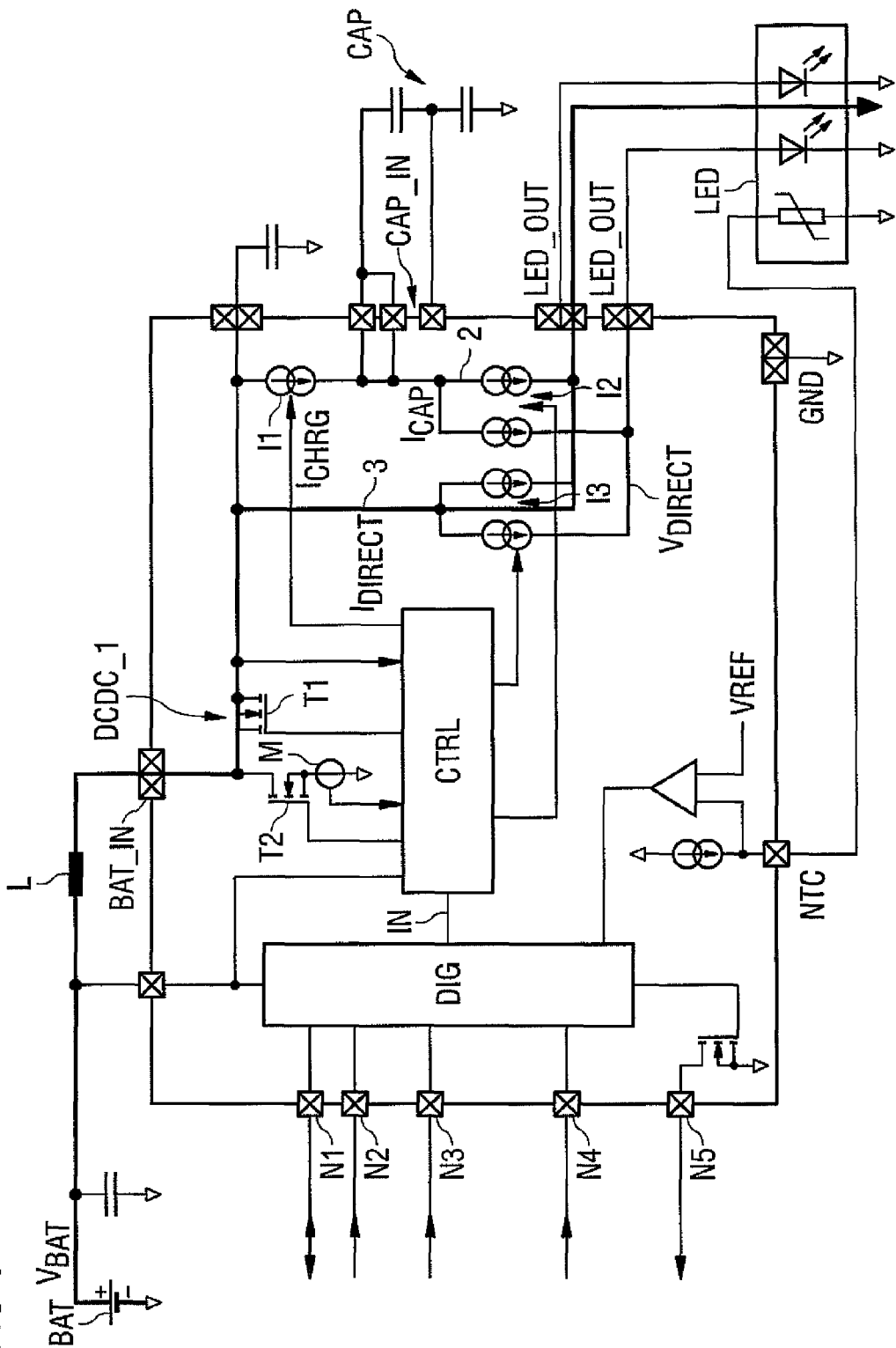
FIG. 3 shows an exemplary embodiment of the circuit arrangement in a second operating mode according to the invention.

FIG. 3 shows an exemplary embodiment of the circuit arrangement in a second operating mode TORCH according to the invention. The second operating mode is possible in addition to the operating mode shown in FIG. 2B. Here only the third adjustable current path 3 is used with the third current source I3 or the direct-use current intensity I_DIRECT.

With this mode it is possible for example to use the light source as a "flashlight" (torch) or the like for a defined time limited by the battery. The power is directly available, because the capacitor need not be charged first. Since no additional components for the flashlight function have to be implemented for use of the circuit arrangement in the second operating mode, this also contributes to a compact design.

Figure 4:
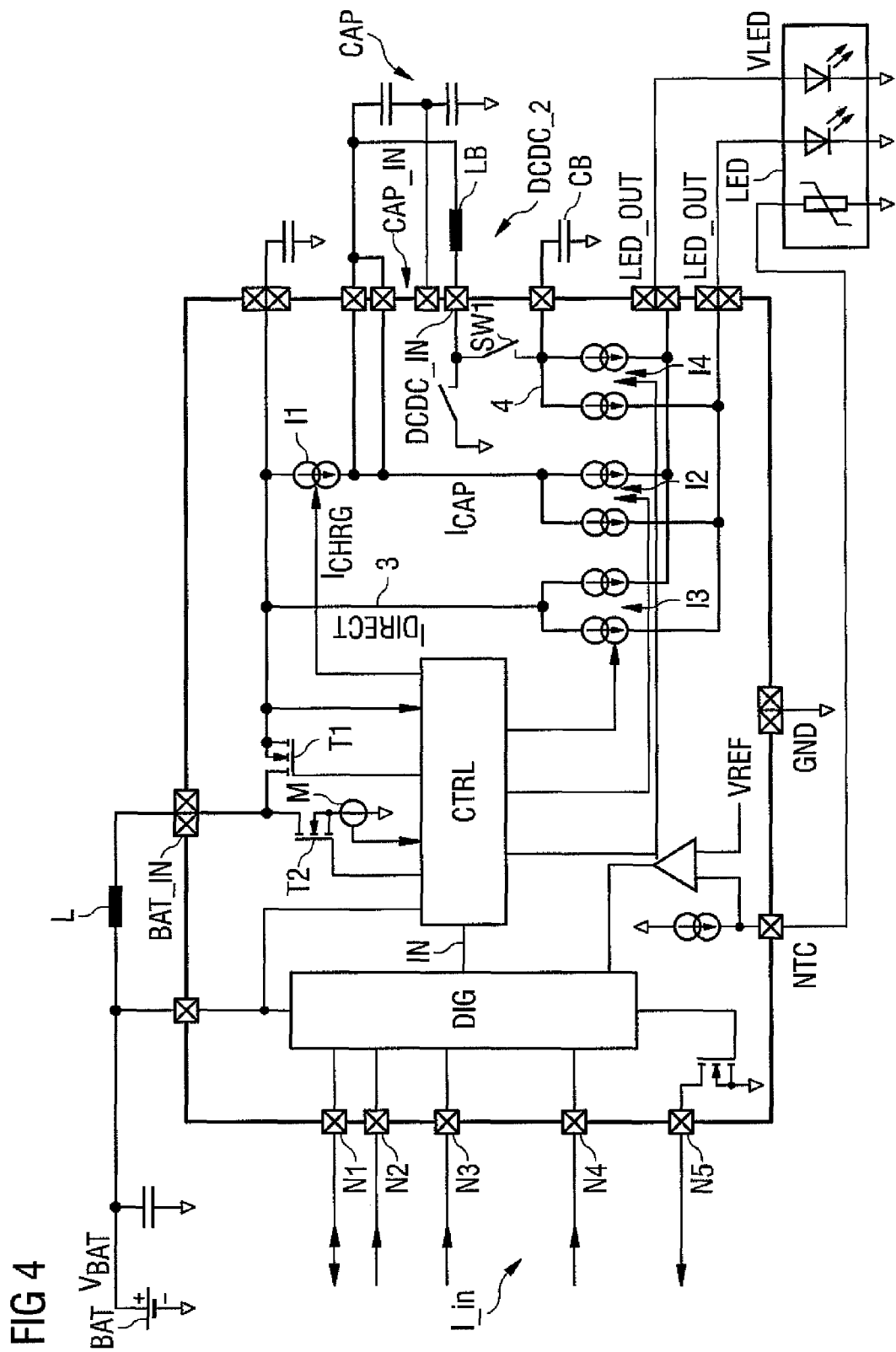
FIG. 4 shows an exemplary embodiment of the circuit arrangement with a second DC-DC converter according to the invention.

FIG. 4 shows another circuit arrangement, here with a second DC-DC converter DCDC_2 according to the invention. In addition to the circuit arrangement shown in FIG. 1, this exemplary embodiment has a terminal DCDC_IN for a rectifier and a fourth current source I4. A fourth current path 4 connects the terminal DCDC_IN for a rectifier to the terminal LED_OUT for a light source.

The second DC-DC converter DCDC_2 is implemented in the form of a step-up converter, for example. For that purpose, it comprises an additional inductor LB, which is coupled to the capacitor CAP and the terminal DCDC_IN for a rectifier. An additional capacitor CB is also connected to the second rectifier. The second rectifier DCDC_2 is electrically connected to the terminal LED_OUT for a light source by means of a switch SW1. Moreover, the fourth current path 4 comprises the fourth current source I4 that is arranged between the second rectifier DCDC_2 and the terminal LED_OUT for the light source.

With the aid of the second rectifier DCDC_2, it is possible to use the residual charge in the capacitor CAP during the first operating mode, by step-up conversion for example. In this manner, the charge stored in the capacitor can be used more efficiently for operating the light source, or the light-emitting diode LED. For this purpose, the second and fourth current paths 2, 4 can be activated independently of one another.

Figure 5:
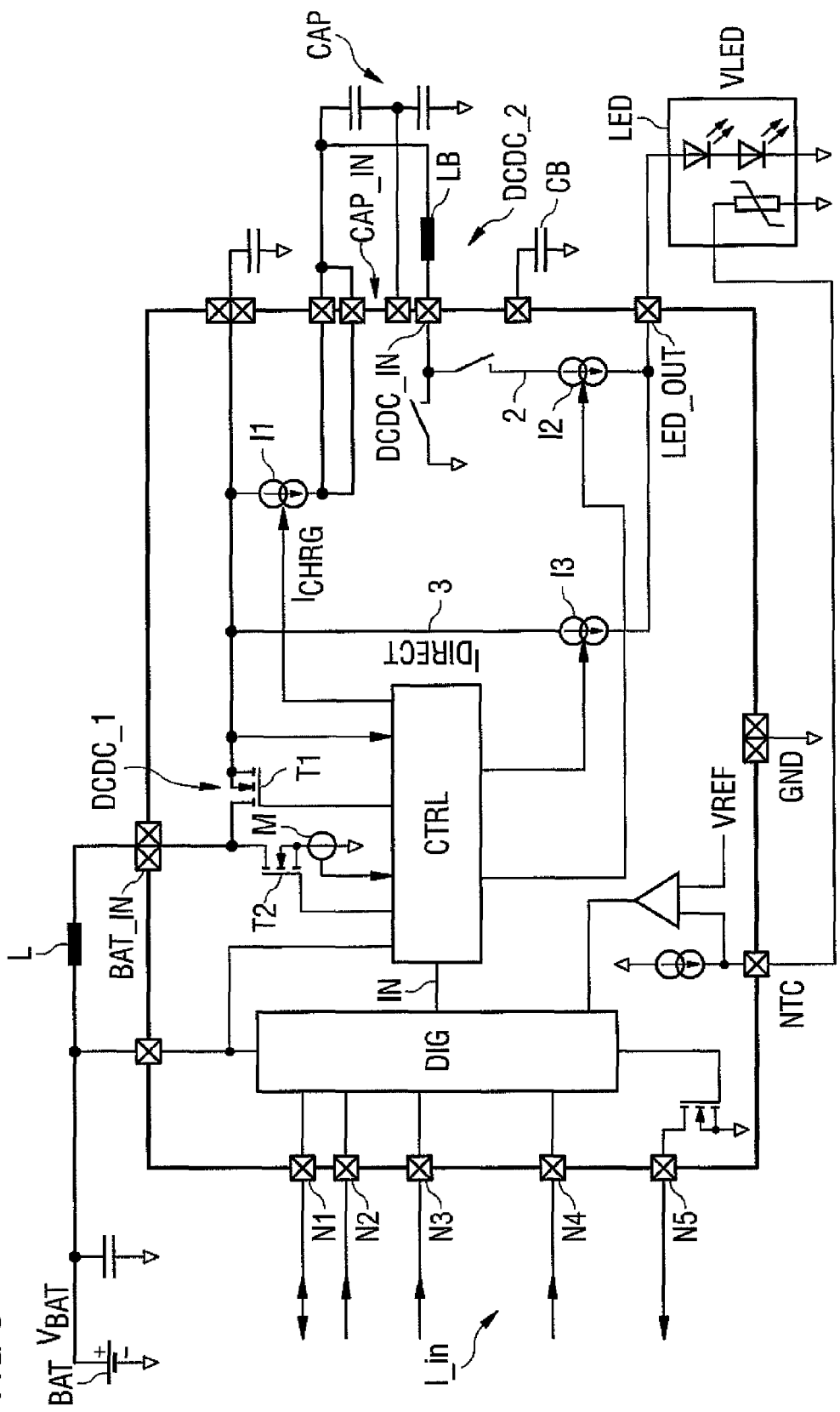
FIG. 5 shows another circuit arrangement with a second DC-DC converter DCDC_2 according to the invention.

FIG. 5 shows another circuit arrangement with a second DC-DC converter DCDC_2 according to the invention. In addition to the circuit arrangement shown in FIG. 1, this exemplary embodiment has a terminal DCDC_IN for a rectifier. The additional fourth current source I4 as in FIG. 4 is not necessarily provided, however. Instead, the second current path 2 with the second current source is implemented in such a manner that the terminal CAP_IN for a capacitor comprises the terminal DCDC_IN for a rectifier, and the second current path 2 leads via the second rectifier DCDC_2 to the terminal LED_OUT for a light source.

A series connection of light sources LED is connected to the terminal LED_OUT for a light source. Therefore only a single terminal LED_OUT is necessary.

Light sources such as LEDs have characteristic forward voltages, which can in turn be dependent on process conditions and temperature. In FIGS. 1-4 the light sources LED that are used are connected in parallel for the sake of example. In this case, it is possible under certain circumstances that the light-emitting diode voltage V_LED is not optimal for each of the light-emitting diodes due to stray forward voltages. The second DC-DC converter DCDC_2 now has the effect that the light-emitting diode voltage V_LED can be efficiently matched to the forward voltages of the light-emitting diodes that are being used. This also has the consequence that the circuit arrangement can have a smaller overall size.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A circuit arrangement for operating a light source, in particular, a light-emitting diode, comprising:
   a first adjustable current path, that connects a terminal for a battery to a terminal for a capacitor;
   a second adjustable current path, that connects the terminal for a capacitor to a terminal for a light source;
   a third adjustable current path that connects the terminal for a battery to the terminal for a light source;
   a control unit, that has a control input and is set up to adjust respective current intensities on the first, second and third current paths as a function of the control signals that can be applied to the control input; and
   a first DC-DC converter, that is coupled to the terminal for a battery in such a manner that the first and third current paths comprise the first DC-DC converter, and that is controllably connected to the control unit by a control line,
   wherein the first DC-DC converter has a load current transistor that couples the terminal for a battery to the terminals for a capacitor and for a light source by means of its load side and is connected to the control unit by its control side, and has a charging current transistor, wherein the terminal is connected in series by its load side to a charging current measuring unit and the control unit, and the charging current transistor is connected by its control side to the control unit.

2. The circuit arrangement according to claim 1, wherein the control unit is configured to:
   adjust a charging current intensity on the first current path in a charging mode; and
   adjust a capacitor current intensity on the second current path and a direct-use current intensity on the third current path in a first operating mode.

3. The circuit arrangement according to claim 1, wherein the control unit is configured to switch between charging mode and first operating mode in such a manner that:
   the charging current intensity is different from zero only in charging mode, and
   the capacitor current intensity and the direct-use current intensity are different from zero only in the first operating mode.

4. The circuit arrangement according to claim 1, having a fourth adjustable current path that
   has a second DC-DC converter, which can be connected by a terminal for a DC-DC converter to the terminal for a capacitor, and
   that couples the terminal for a DC-DC converter to the terminal for a light source, or
   the second adjustable current path has the second DC-DC converter, and the terminal for a capacitor comprises the terminal for a rectifier.

5. The circuit arrangement according to claim 4, wherein the first, second, third and fourth current paths have respective controllable switches.

6. The circuit arrangement according to claim 4, wherein the first, second, third and fourth current paths have respective controllable current sources.

7. The circuit arrangement according to claim 2, wherein the control unit adjusts the direct-use current intensity only by the third current path in a second operating mode.

8. A method for operating a light source, comprising:
   adjusting a current intensity on one or more of a first, second and third adjustable current path as a function of a battery voltage;
   charging a capacitor to a charge voltage in a charging mode by the first adjustable current path; and
   operating the light source in a first operating mode by the second and third current path simultaneously,
   wherein adjusting a current intensity on one or more of the first, second and third adjustable current path as a function of a battery voltage comprises adjusting, by a control unit operatively coupled to a DC-DC converter, a load current that is fed into the first and third adjustable current paths, wherein the DC-DC converter comprises a load current transistor and a charging current transistor, wherein the load current transistor is configured to couple a terminal for a battery to terminals for a capacitor and for a light source by its load side and is coupled to the control unit by its control side, wherein the charging current transistor is configured to couple in series the terminal for a battery by its load side to a charging current measuring unit and the control unit, and wherein the charging current transistor is coupled by its control side to the control unit.

9. The method according to claim 8, wherein
   in the charging mode, a charging current intensity is adjusted on the first current path as a function of the battery voltage, and
   in the first operating mode, a capacitor current intensity is adjusted on the second current path as a function of the charging voltage, and a direct-use current intensity is adjusted on the third path as a function of the battery voltage.

10. The method according to claim 9, wherein
    the charging current intensity is different from zero only in the charging mode, and
    the capacitor current intensity and the direct-use current intensity are different from zero only in the first operating mode.

11. The method according to claim 9, wherein the direct-use current intensity is adjusted only by means of the third current path in a second operating mode.

12. The method according to claim 8, wherein an auxiliary current intensity is adjusted in the first operating mode by a fourth current path as a function of the charging voltage, and both the direct-use current intensity and the capacitor current intensity are superimposed to operate the light source.

* * * * *